United States Patent [19]
Ford

[11] 3,781,693
[45] Dec. 25, 1973

[54] LOGARITHMIC AMPLIFICATION CIRCUIT
[75] Inventor: Peter W. Ford, Winchester, Mass.
[73] Assignee: Itek Corporation, Lexington, Mass.
[22] Filed: Mar. 29, 1972
[21] Appl. No.: 239,177

[52] U.S. Cl............... 328/145, 309/229, 307/230, 307/310
[51] Int. Cl........................ H03k 17/03, G06g 7/24
[58] Field of Search................... 307/229, 230, 310; 328/145; 250/117 SS

[56] References Cited
UNITED STATES PATENTS
| | | | |
|---|---|---|---|
| 3,153,152 | 10/1964 | Hoffman, Jr. | 307/229 |
| 3,304,430 | 2/1967 | Biard et al. | 250/217 SS |
| 3,584,232 | 6/1971 | Wallace, Jr. | 307/229 |
| 3,399,348 | 8/1968 | Praglin et al. | 250/217 SS |

FOREIGN PATENTS OR APPLICATIONS
| | | | |
|---|---|---|---|
| 1,305,688 | 10/1962 | France | 328/145 |

*Primary Examiner*—John S. Heyman
*Assistant Examiner*—B. P. Davis
*Attorney*—Homer C. Blair et al.

[57] ABSTRACT

A circuit for generating an output signal that is a logarithmic function of an applied input signal. The circuit comprises an input signal source exhibiting the properties of an ideal constant current source, an amplifier coupled to said source, and a diode or other logarithmic element coupled across the source and between the source and the amplifier. The circuit is designed such that the amplifier will present a substantially infinite impedance to the diode and this property coupled with the substantially infinite impedance of the source will cause essentially all the input current to flow through the diode and be unaffected by any other components in the circuit. The voltage across the diode will thus be an accurate logarithmic function of the input current signal throughout a range up to six decades or more.

10 Claims, 2 Drawing Figures

PATENTED DEC 25 1973                                    3,781,693

LOGARITHMIC AMPLIFICATION CIRCUIT

BACKGROUND OF THE INVENTION

1. Field of the Invention

The present invention relates generally to circuits for generating an output signal that is a logarithmic function of an applied input signal. In addition, the present invention relates to measuring apparatus for generating output signals that are proportional to the log of the value of a parameter being investigated.

2. Description of the Prior Art

Circuits for converting electrical signals into logarithmic form are known and find use in a wide variety of different applications. In analog computer operations, for example, the solution of problems often necessitates that signals generated within the computer be multiplied or divided. In general, it has been found to be simpler to first convert these voltages or currents into logarithmic form so that they may then be merely added or subtracted than it is to perform the calculations directly.

Log circuits have also proven to be valuable tools in many types of measuring or detecting systems. For example, in the photogrammetric field, the values of a parameter such as image density or light intensity may vary over a range covering several orders of magnitude, and the ability to convert these values into a logarithmic format enables data to be printed out or stored in a more compressed form. This permits conservation of the print-out or storage medium and, in addition, often simplifies the data analysis.

Because of these many important uses, a large variety of logarithmic circuits have been designed and built in the past. In general, however, these prior art circuits suffer from a number of disadvantages making them unacceptable in many applications. For one thing, many of these circuits are accurate only within a relatively narrow range, for example, one or two decades. An example of such a circuit is described in U.S. Pat. No. 2,861,182 to Green. In circuits of this type, the limited range is attributable, at least in part, to the fact that the voltage across the components of the circuit having log characteristics becomes significantly affected by other components in the circuit when the amplitude of the input signal falls outside of a relatively narrow range.

Yet other circuits do not provide a sufficient degree of flexibility or control over the logarithmic characteristics of the circuit. In many circuits, for example, the component exhibiting logarithmic characteristics is positioned in the feedback loop of an amplifier which prevents control over such factors as the proportionality between the output and input signals.

In addition, many circuits are highly sensitive to noise and other spurious signals which not only affect the accuracy of the circuit, but can actually result in damage to it. Finally, many prior art systems are not capable of effectively responding to extremely small amplitude signals which is necessary in many applications.

BRIEF SUMMARY OF A PREFERRED EMBODIMENT OF THE INVENTION

In accordance with the preferred embodiments of the present invention, many of the above deficiencies are obviated by providing a relatively simple electronic circuit that will provide an output signal that is an accurate logarithmic function of an applied input signal and that will retain its accuracy over a substantially wide range of input values. In accordance with a preferred embodiment, the circuit employs a differential amplifier one input of which is coupled to a source of input current. Coupled across the input source and between the input source and the amplifier is a nonlinear impedance device, such as a diode, that exhibits logarithmic characteristics.

In the configuration provided, the amplifier will present a substantially infinite impedance to the input current signal such that essentially all of the input current will flow through the diode (hereinafter referred to as a converter diode for clarity). In addition, the input source is preferably of the type that approximates the properties of an ideal current source i.e. it has a substantially infinite internal impedance such that its current output will not vary as the internal impedance of the converter diode varies. No other significant circuit components are present or are required in the converter diode containing loop of the circuit and, as a result, essentially all of the input current will flow through the converter diode and the voltage thereacross will be unaffected by any other circuit components, and be a true logarithmic function of the input signal. Appropriate amplifier control circuitry is preferably also provided to permit control of the proportionality relationship between the linear input signal and the logarithmic output signal as well as adjustment of the zero setting of the output signal with respect to the input signal.

Because there is nothing in the circuit that will significantly affect the voltage across the converter diode other than the value of the input signal itself, the circuit will be very accurate over a substantially wide range of input values, for example, from 3 to 6 decades. In the prior art, one or two decades is usually considered to be an effective range. In addition, the ability to control the proportionality between the input and output signals and to reference the output signal with respect to the input signal provides the circuit with substantial flexibility making it a more valuable tool. Also, the circuit is less sensitive to external noise than many other prior art systems. Finally, the circuit is quite inexpensive to build and simple in design and thus may readily be incorporated into a wide variety of equipment without significantly adding to their cost.

DETAILED DESCRIPTION OF THE PREFERRED EMBODIMENTS

Figure 1:
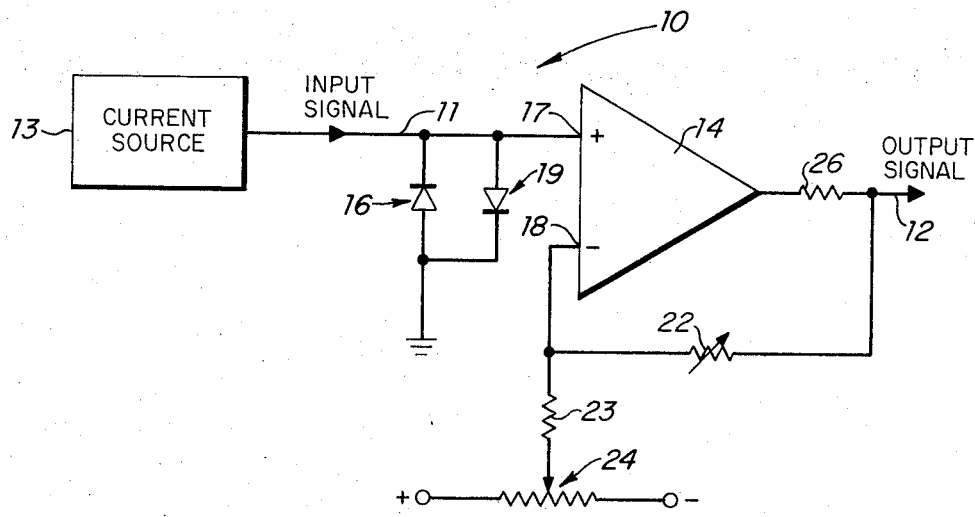
FIG. 1 illustrates a logarithmic circuit designed in accordance with a preferred embodiment of the present invention.

FIG. 1 illustrates a logarithmic amplification circuit (generally identified by reference number 10) for converting an input signal on line 11 to an output signal on line 12 that is proportional to the log of the input signal on line 11. The input signal source is illustrated schematically as a current source 13 which, in accordance with a preferred embodiment, approximates the properties of an ideal current source. Such sources are characterized by having a substantially infinite internal impedance (e.g. $10^{10}$ ohms) such that its current output will be independent of and unaffected by any voltage variations across the source. Sources exhibiting these characteristics over wide operating ranges and particularly suitable with the invention include PIN diodes and photomultiplier tubes.

In one possible application of the present invention, the circuit illustrated in FIG. 1 might be employed in a system utilized to detect or measure the image density of photographic film or the like. In an application such as this, a PIN diode would be positioned to receive light passed through the film. This light would be modulated by the film in accordance with its density characteristics and, as is understood in the art, the PIN diode output will be a current signal that is linearly related to the intensity of this modulated light. Accordingly, the signal at input 11 of the circuit of FIG. 1 would be representative of the intensity of the light received by the PIN diode and hence of the image density of the film.

Since the value of a parameter such as image density might vary over a range covering several orders of magnitude, a direct plot of the data would not only require a large area of graph paper or other output or storage medium, but would also be difficult to analyze. Therefore, it is usually desirable to first convert the received signal into a logarithmic format so that the data may be compressed into a more manageable form. The circuit illustrated in FIG. 1 is particularly suitable for accomplishing this and will produce output signals that accurately represent the log of the input signals over a wide range.

With reference back to FIG. 1, the input signal source 13 is coupled to non-inverting terminal 17 of a differential amplifier 14. A converter diode 16 is, in turn, coupled across source 13 and between the source and the amplifier to ground. As is known to those skilled in the art, a diode is a non-linear impedance device whose impedance varies logarithmically as a function of the current flowing through it, and accordingly, the voltage across the diode will also be proportional to the log of the current flowing through it. In the circuit, the amplifier is connected as a voltage follower whereby the voltage across the converter diode will be amplified by the amplifier and the signal at output terminal 12 will be a signal proportional to the log of the current flowing through the diode 16.

In such a configuration, also, the amplifier presents a substantially infinite impedance to the converter diode, and, therefore, essentially all of the current from source 13 will flow through it. Hence, the output signal at 12 will truly represent the log of the input signal at 11. Furthermore, since the current source 13 has a substantially infinite internal impedance, the signal at 11 will not be affected by other components in the circuit but will be a function solely of the light intensity or other parameter it receives. This means that the output signal at 12 will also be truly proportional to the log of the light intensity impinging upon the source 13.

These are important features and have the effect of providing the circuit with accurate log characteristics over a significantly wider range than generally available with prior art circuits. In prior art configurations, resistors or other components are utilized to produce the current passed through the converter diode and these components introduce non-linearities into the circuit which significantly limit the effective range of the circuit. By the present invention, however, no additional circuit components are needed, and accordingly, the voltage across the converter diode 16 and the output signal on line 12 will be an accurate logarithmic function of the input current on line 11, through a substantially extended effective range to six decades or more.

Still referring to FIG. 1, a second converter diode 19 may also be coupled into the circuit in parallel with diode 16 and oppositely poled with respect thereto. With this provision, one diode will conduct current in the positive direction while the other will conduct current in the negative direction. This arrangement also provides a second advantage in that the non-conducting diode will prevent the amplifier from floating or reversing due to input current reversals or noise.

As also shown in FIG. 1, appropriate amplifier control circuitry is preferably provided to permit control over the output signal and thus provide a high degree of flexibility to the circuit. As illustrated, this control circuitry includes a first resistor 22 coupled from the amplifier output 12 to input terminal 18. A second resistor 23 is coupled from terminal 18 of the amplifier to a potentiometer 24 which, in turn, is coupled to a suitable source of power as illustrated. The ratio between the resistances of resistors 22, 23 and 24 sets the gain of the amplifier and hence the proportionality constant between the input and output signals of the circuit. By making resistor 22 variable it becomes possible to adjust this value. In a similar manner, potentiometer 24 controls the reference setting of the amplifier such that a zero output signal can be set to correspond to any desired input signal value. These controls provide the circuit with substantial flexibility not found in many prior art logarithmic amplification circuits and permits the output signal to be adjusted as desired.

A resistor 26 coupled to output terminal 12 of the amplifier is also provided as a blocking resistor to limit short circuit current flow through the amplifier as is well-known.

Figure 2:
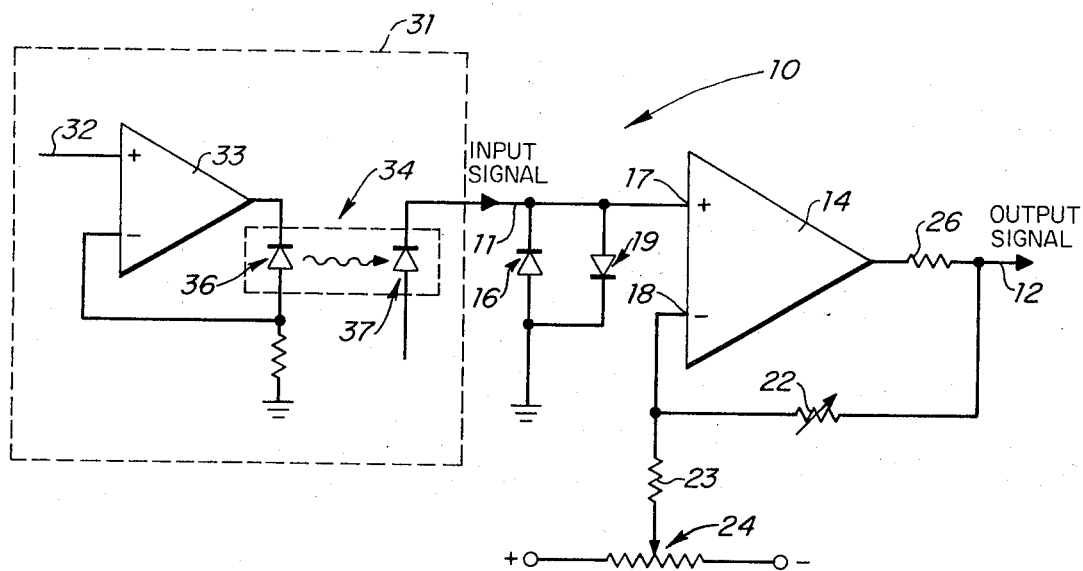
FIG. 2 illustrates a modification of the circuit of FIG. 1.

As was described previously, logarithmic amplification circuit 20 is designated to receive an input signal from a source that approximates the properties of an ideal current source. Since many sources do not have such properties, it may be desirable to modify the circuit for use in these other applications. One such alteration is illustrated in FIG. 2. The circuit of FIG. 2 differs from FIG. 1 in the input signal source which, in this embodiment, is illustrated by dashed box 31. A signal on line 32 coming from any conventional source is first amplified by amplifier 33 and then passed into a photon coupled pair unit 34. As is recognized by those skilled in the art, in such a unit, a first diode 36 will produce light energy which is proportional to the current flowing through the diode. This light energy is received by the second diode 37 of the unit which converts the light energy into a current signal on line 11. The photon coupled pair unit approximates the properties of an ideal current source and hence the signal on line 11 may be treated exactly as in FIG. 1 and none of the valuable properties of the present circuit are lost.

In an operative embodiment of the circuits illustrated in FIGS. 1 or 2, the following circuit components may be used:

| | |
|---|---|
| Converter diodes 16 or 19 | type In 4454 |
| Amplifier 14 | type AD801 with a gain set around 30 by resistors 22, 23 and 24 |
| Blocking resistor 26 | 200 ohms |
| Resistor 22 | about 300k ohms although preferably variable |
| Resistor 23 | 5k ohms |
| Potentiometer 24 | about 20k ohms |

Obviously these components could be modified or their values varied if so desired. For example, rather than a diode, other well-known components exhibiting log characteristics could be employed such as a transistor coupled as a diode.

In conclusion, the present invention provides a system for producing an output signal that is a logarithmic function of an applied input signal and that will produce an accurate logarithmic output over a range of several orders of magnitude. Because of the design of the circuit, it is less sensitive to noise than those of the prior art. The speed of response of the circuit is independent of the input signal. Also, the gain of the device may be adjustable to give any desired voltage change per decade within the wide limits of the amplifier. The system is extremely simple in design and inexpensive to construct from components readily available in the market place and may, therefore, find use in a wide variety of applications.

Various modifications and substitutions may be made in the circuit as recognized by those skilled in the art and for those reasons it should be understood that the invention should be limited only as required by the scope of the following claims.

I claim

1. A logarithmic generator for producing an output signal that is a logarithmic function of an applied input signal comprising:
    a. input means for producing an input current signal, said input means having a very high internal impedance approximating the properties of an ideal current source;
    b. an amplifier having input and output terminals and having a very high input impedance;
    c. means for coupling an input terminal of said amplifier to said input means; and
    d. impedance means coupled across said input means between said input means and said input terminal of said amplifier, said impedance means consisting essentially of non-linear impedance means having an impedance that is negligible as compared to the impedance of said input means and said amplifier such that substantially all of said input current will flow through said non-linear impedance means, the voltage generated across said non-linear impedance means will be a logarithmic function of the current flowing through it and the signal produced at the output terminal of said amplifier will be a logarithmic function of said input signal.

2. A logarithmic generator as recited in claim 1 wherein said amplifier comprises a differential amplifier.

3. A logarithmic generator as recited in claim 2 and further including means for controlling the gain of said differential amplifier for controlling the functional relationship between said output logarithmic signal and said input signal.

4. A logarithmic generator as recited in claim 3 and further including means for adjusting the reference position of said differential amplifier with respect to said input signal.

5. A logarithmic generator as recited in claim 1 wherein said non-linear impedance means consists essentially of a diode.

6. A logarithmic generator as recited in claim 1 wherein said non-linear impedance means consists essentially of a pair of diodes coupled in parallel and oppositely poled such that current will flow through one or the other of said diodes dependent upon the direction of flow of said input current signal.

7. A logarithmic generator as recited in claim 1 wherein said input means comprises a PIN diode.

8. A logarithmic generator as recited in claim 1 wherein said input means comprises a photon coupled pair unit.

9. Apparatus for monitoring the condition of a function and for producing an output signal that is logarithmically related to said monitored function comprising:
    a. means for monitoring said function and for producing a current signal that is linearly related to said function, said monitoring means having a very high internal impedance approximating the properties of an ideal current source;
    b. amplifier means having input and output terminals and having a very high input impedance;
    c. means for coupling said monitoring means to the input terminal of said amplifier means;
    d. impedance means coupled across said monitoring means between said monitoring means and said input terminal of said amplifier means, said impedance means consisting essentially of non-linear impedance means having an impedance that is negligible compared to the impedances of said monitoring means and said amplifier means such that substantially all of said current will flow through said non-linear impedance means wherein the voltage generated across said non-linear impedance means is a logarithmic function of the current flowing through it such that the signal produced at the output terminal of the amplifier means will be logarithmically related to said monitored function.

10. Apparatus as recited in claim 9 wherein said monitored function is light intensity and wherein said monitoring means comprises a PIN diode.

* * * * *